United States Patent
Li et al.

(10) Patent No.: US 7,715,106 B2
(45) Date of Patent: May 11, 2010

(54) LIQUID-CONTROL OPTICAL ELEMENT AND MANUFACTURING METHOD THEREOF AND DEVICE HAVING THE SAME

(75) Inventors: Yu-Tang Li, Taipei County (TW); Chia-Kuo Yen, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 517 days.

(21) Appl. No.: 11/675,086

(22) Filed: Feb. 15, 2007

(65) Prior Publication Data

US 2008/0088940 A1    Apr. 17, 2008

(30) Foreign Application Priority Data

Oct. 16, 2006    (TW) ............... 95138015 A (51) Int. Cl.
*G02B 1/06* (2006.01)
(52) U.S. Cl. ..................... 359/665; 359/666
(58) Field of Classification Search ............ 359/665, 359/666
See application file for complete search history.

(56) References Cited

U.S. PATENT DOCUMENTS

| | | | |
|---|---|---|---|
| 6,288,767 B1 * | 9/2001 | Murata et al. ............. 349/200 |
| 6,369,954 B1 | 4/2002 | Berge et al. |
| 6,603,444 B1 | 8/2003 | Kawanami et al. |
| 7,126,903 B2 * | 10/2006 | Feenstra et al. ........ 369/112.23 |
| 7,230,771 B2 * | 6/2007 | Kuiper et al. ............... 359/665 |
| 7,420,608 B2 * | 9/2008 | Yamasaki .............. 348/333.01 |
| 7,537,680 B2 * | 5/2009 | Ross et al. ................. 204/450 |
| 2005/0113912 A1 | 5/2005 | Feenstra et al. |
| 2006/0047039 A1 | 3/2006 | Kato et al. |

FOREIGN PATENT DOCUMENTS

| | | |
|---|---|---|
| WO | 2004038480 | 5/2004 |
| WO | WO 2005/006029 | * 1/2005 |
| WO | 2005093489 | 10/2005 |
| WO | 2005096069 | 10/2005 |
| WO | WO 2005/101091 | * 10/2005 |

OTHER PUBLICATIONS

"Office Action of Taiwan counterpart application", issued on Oct. 30, 2009, p. 1-p. 10.

* cited by examiner

*Primary Examiner*—Timothy J Thompson
(74) *Attorney, Agent, or Firm*—Jiang Chyun IP Office (57) ABSTRACT

A liquid-control optical element is provided herein. The optical element includes two liquids with different phases. The two liquids are immiscible and have different optical index. By applying a voltage through electrodes to form an electric field, the slope of an interface between the two liquids is changed. The purpose of changing the slope is to change the shape of the interface or the moving or rotating direction. Thus, according to the law of total internal reflection or the law of refraction, the liquid-control optical element can be used as a liquid shutter device, or a liquid scanner device if a scanning is performed after penetrating the element.

34 Claims, 10 Drawing Sheets

LIQUID-CONTROL OPTICAL ELEMENT AND MANUFACTURING METHOD THEREOF AND DEVICE HAVING THE SAME

CROSS-REFERENCE TO RELATED APPLICATION

This application claims the priority benefit of Taiwan application ser. No. 95138015, filed Oct. 16, 2006. All disclosure of the Taiwan application is incorporated herein by reference.

BACKGROUND OF THE INVENTION

1. Field of the Invention

The present invention relates to an optical element, and more particularly to an optical element that utilizes electrodes to apply a voltage to change the slope of an interface between two liquids with different phases so that the light path of a light beam is changed.

2. Description of Related Art

Due to current demands for camera phones, a wave of upstream business opportunity for materials and device components of mobile phones is likely to appear. In particular, camera modules are going to be one of the most important developing items. According to a developing trend of the mobile phones, most of the mobile phones have a camera module with digital focusing function. Because mobile phones have to occupy a small volume, the digital focusing is a convenient selection. However, the digital focusing cannot completely satisfy the demands of consumers anymore. Yet, optical focusing module, when applied to a camera phone, has the setback of occupying a relatively large volume. As a result, the optical focusing module having a small volume is now one of the goals in research. The French Company Varioptic and the Dutch Company Philip have separately developed small volume liquid-control automatic optical focusing modules. The French Company Varioptic has authorized the Korean Company Samsung to apply the technique to the camera module of the camera phone. However, the liquid lens technique is mainly applied to optical focusing. In fact, the only function of the liquid lens is to change the focus and nothing else.

Figure 1:
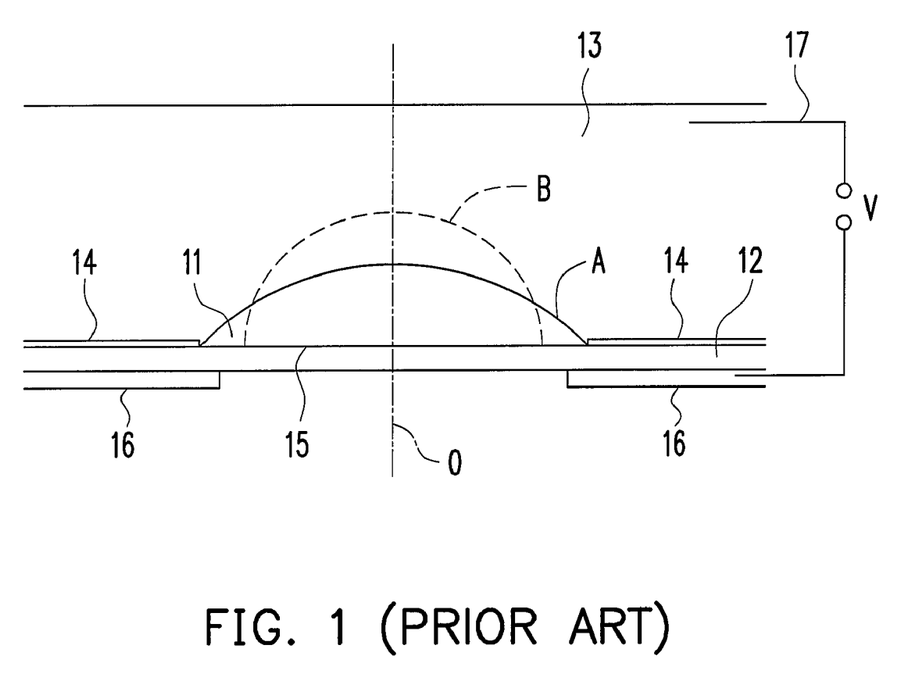
FIG. 1 is a schematic diagram of a conventional variable zoom lens.

For example, in U.S. Pat. No. 6,369,954 with the title 'LENS WITH VARIABLE FOCUS', a variable zoom lens is proposed, as shown in FIG. 1. The variable zoom lens includes a chamber 12 filled with a first liquid 13 and a second liquid 11 in the form of a drop disposed on a connecting area 15 of an inner surface of the chamber 12. The inner surface of the chamber 12 and the area surrounding the connecting area 15 have specially treated surfaces 14 for maintaining the drop configuration of the second liquid 11. The liquids 11 and 13 are transparent and immiscible and have different optical indexes. On the outer surface of the chamber 12, electrodes 16 are laid around the connecting area 15 and another electrode 17 is electrically connected to the first liquid 13. When a voltage is applied to the electrodes 16 and 17, a corresponding electric field is produced so that the shape of the liquid drop 11 is changed. Thus, by using two layers of the liquids 11 and 13 with two different phases and applying a voltage to change the interface curvature (from curvature A to curvature B in FIG. 1), the focus of an incident light beam is changed. The mechanism is mainly applied to an optical lens. In this patent, there is a change in the curvature of the interface between the two liquids after a voltage is applied. Hence, a change of focus of an incident light beam is facilitated. However, this structure only changes the focus points and provides no other functions.

Figure 2A:
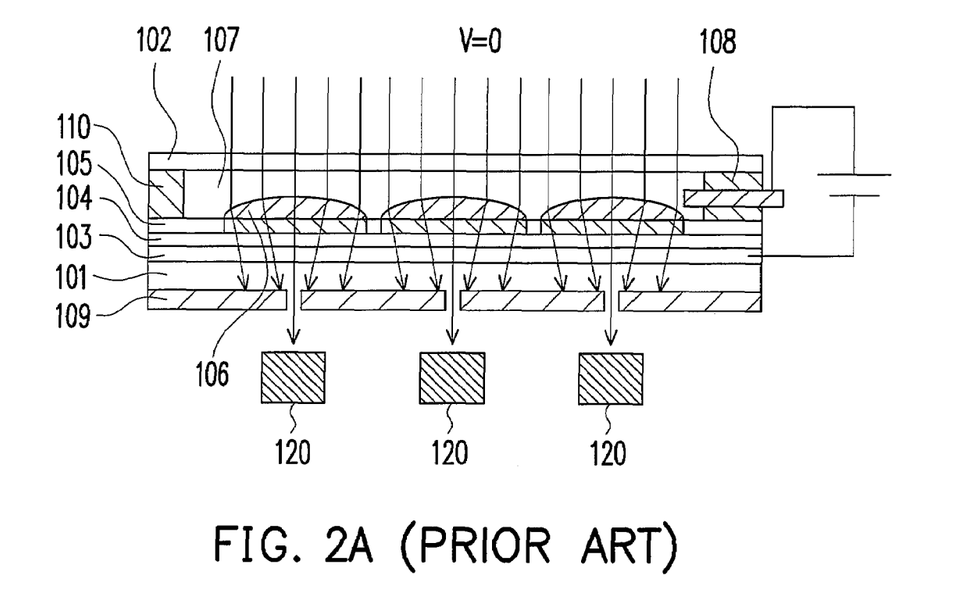
FIGS. 2A and 2B are schematic diagrams showing the display elements used in a conventional display device.
Figure 2B:
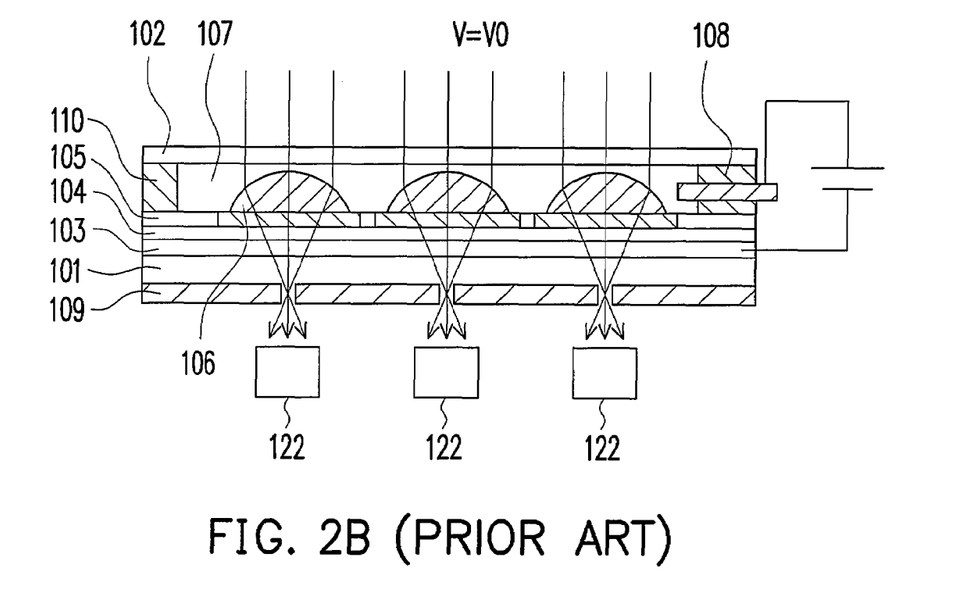

In U.S. Pat. No. 6,603,444 with the title 'DISPLAY ELEMENT AND DISPLAY DEVICE HAVING IT', a type of display element to be used in a display device is proposed. The display elements are assembled as pixels of the display device. As shown in FIGS. 2A and 2B, the display elements are enclosed within the first substrate 101 and the second substrate 102. An active element array substrate 103 disposed therebetween is regarded as a first electrode. Furthermore, the display elements further include an insulating layer 104, a surface treatment layer 105, a first liquid 106, an electroconductive electrolyte solution 107, a second liquid, an inverting electrode 108 and a mask 109. This patent uses different voltages to change the curvature of the liquid interface so that light beams are allowed to penetrate through the focusing points. Other than the focusing points, the light beam can be blocked. Therefore, by using a suitable voltage to control the focusing points, the penetration of an incident light beam can be controlled to form bright and dark dots in the display device. For example, when 0(V) volt is applied as shown in FIG. 2A, dark dots 120 appears on the display device. On the other hand, when $V_0$ (V) volt is applied as shown in FIG. 2B, bright dots 122 appears on the display device. However, the main function in the present case is to change the focus in order to control brightness and darkness while other functions are not provided. In other words, it is purely an application of curvature modification to change the focusing point of an incident light beam.

SUMMARY OF THE INVENTION

The present invention relates to provide a liquid-control optical element based on controlling a slope of a liquid interface, which is useful in many applications involving the liquid lens technique.

The invention provides a liquid-control optical element. The element includes two liquids with different phases. The two liquids are immiscible and have different optical indexes. By applying a voltage through electrodes to form an electric field, the slope of the interface between the two liquids is changed. The changing the slope is to change the shape of the interface or the moving or rotating direction. Thus, according to a law of total internal reflection or a law of refraction, the liquid-control optical element can be used as a liquid shutter device, or a liquid scanner device if a scanning is performed after penetrating the element.

The present invention provides a liquid-control optical element that includes a first liquid and a second liquid. The first liquid and the second liquid form an immiscible liquid interface inside the optical element. The liquid-control optical element further includes a liquid carrier. The inner layer on a sidewall of the liquid carrier is an insulating layer, and the interior of the insulating layer carries the first liquid and the second liquid. A pair of side electrode layers is provided in the middle between the sidewalls and the insulating layer on opposing sides of the liquid carrier. The top and bottom surface layers of the liquid carrier are a transparent electrode layer and a transparent layer respectively and a conductive circuit is used to connect the two side electrode layers separated by the insulating layer and the transparent electrode layer. A voltage difference is applied to the conductive circuit having been connected to the two side electrode layers and the transparent electrode layer to produce a controlling electric field inside the liquid carrier of the liquid-control optical element. By using the controlling electric field to change the slope of the immiscible liquid interface, a liquid-control optical element capable of controlling the light path of an incident light beam is produced.

The present invention provides a method of manufacturing a liquid-control optical element. A liquid carrier is provided. An insulating layer is coated on the inner sidewall layer of the liquid carrier. At least two side electrode layers are coated in the middle between the sidewall of the liquid carrier and the insulating layer. A transparent electrode layer and a transparent layer are coated on the top and bottom surface layers of the liquid carrier respectively. A conductive circuit is used to connect the foregoing at least two side electrode layers separated by the insulating layer and the transparent electrode layer. A first liquid and a second liquid are sequentially loaded into the liquid carrier such that the first liquid is stacked on top of the second liquid. The contact area between the first liquid and the second liquid form an immiscible liquid interface. A voltage difference is applied to the conductive circuit having been connected to the two side electrode layers and the transparent electrode layer to produce a controlling electric field inside the liquid carrier of the liquid-control optical element. By using the controlling electric field to change the slope of the immiscible liquid interface, a liquid-control optical element capable of controlling the light path of an incident light beam is produced.

The present invention also provides an optical device having a plurality of liquid-control optical elements. Each liquid-control optical element includes a liquid interface between two immiscible liquids controlled by a controlling electric field. The liquid-control optical elements are arranged to form an array. Furthermore, each liquid-control optical element is controlled through a plurality of voltage sources. By controlling the voltage difference to change the electric field, the slope of the planar liquid interface between the two immiscible liquids is adjusted so that the refracting and reflecting angle of an incident light beam through each liquid-control optical element can be controlled.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The present invention provides a liquid-control optical element. The liquid-control optical element includes two liquids with different phases, for example, a water-phase liquid (or a conductive liquid) and an oil-phase liquid (or a non-conductive liquid). The two liquids are immiscible and have different optical index. By applying a voltage through electrodes to form an electric field, the plane angle of the immiscible liquid interface is changed. The purpose of changing the plane angle is to change the shape of the interface or the moving or rotating direction. Therefore, for example, the angle of the slope of the contact interface between the water-phase liquid and the oil-phase liquid can be changed. Thus, according to a law of total internal reflection or a law of refraction, a light beam incident on the contact interface is either blocked or refracted in another angle to produce a liquid shutter device, or a liquid scanner device if a scanning is performed after penetrating the element.

The two liquids inside the foregoing liquid-control optical element, for example, the water-phase liquid and the oil-phase liquid are not limited to a two-layer disposition. The water-phase liquid and the oil-phase liquid can be alternately disposed to form three layers or more than three layers, for example. Furthermore, two or more liquid-control optical elements can be stacked to form a structure capable of performing total internal reflection and refraction operation.

The liquid-control optical element of the present invention basically includes at least two electrodes and two insulating carrier layer, and the two liquids are disposed inside the optical element. By applying a voltage to the two electrodes to form an electric field, the slope of the interface between the two liquids is changed. Therefore, the voltage can be used to control whether an incident light beam follows a penetrating path or a total internal reflection path and hence act as a light switch. On the other hand, by using the voltage to control the degree of refraction in the penetration so that a different light path is selected when a different voltage is applied, a scanning function is achieved. This patent proposes a method of changing the two electrodes and the slope of the liquid interface and then using a voltage to control whether an incident light beam follows a penetrating path or a total internal reflection path. Hence, a liquid shutter device capable of controlling incoming light beam is produced. In another embodiment, the same principles can be applied to extend to devices with four electrodes or six electrodes so that the present invention can be applied to different areas.

For example, if a four electrode liquid-control optical element is deployed, the optical element can be applied to a two-dimensional scanning. With a total of four electrodes, a selection of the horizontal axis and the vertical axis (that is, the X and Y-axis) on a plane can be made. Together with the shutter device, the optical element can be applied to a scanner display such as a laser scanner display, for example, a television, laser show, integrated palmtop phone or pen display, simulated virtual keyboard, pattern display of laser pointer, two-dimensional barcode reader or smart headlight, three-dimensional display or back light module of a liquid crystal display.

Figure 3A:
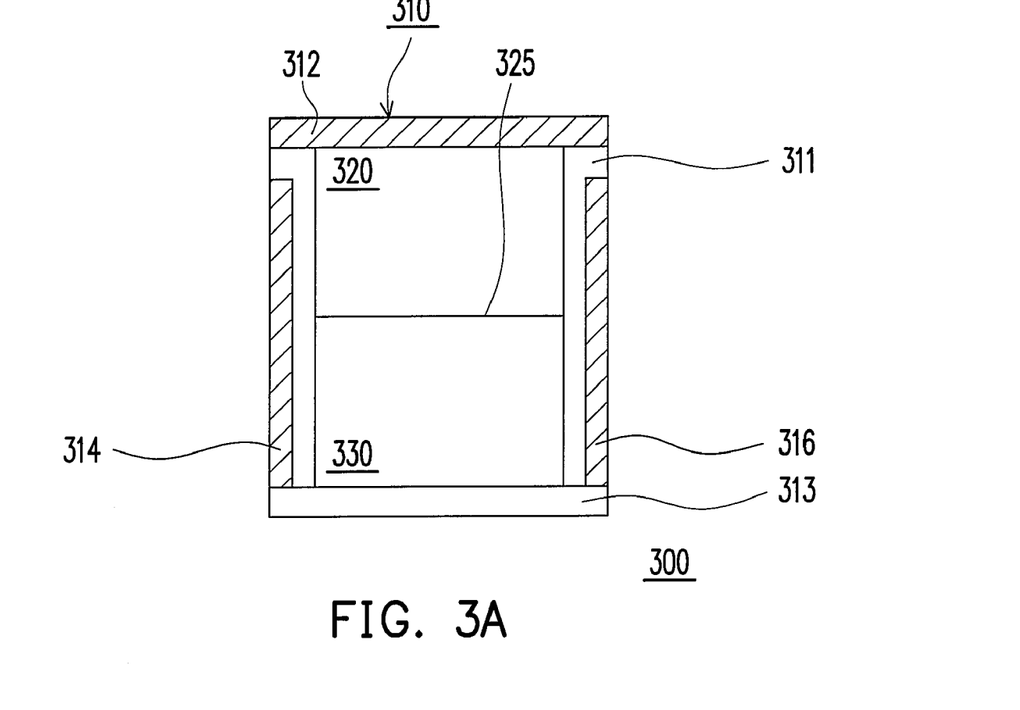
FIGS. 3A through 3C are schematic cross-sectional views of liquid-control optical elements according to a preferred embodiment of the present invention.
Figure 3B:
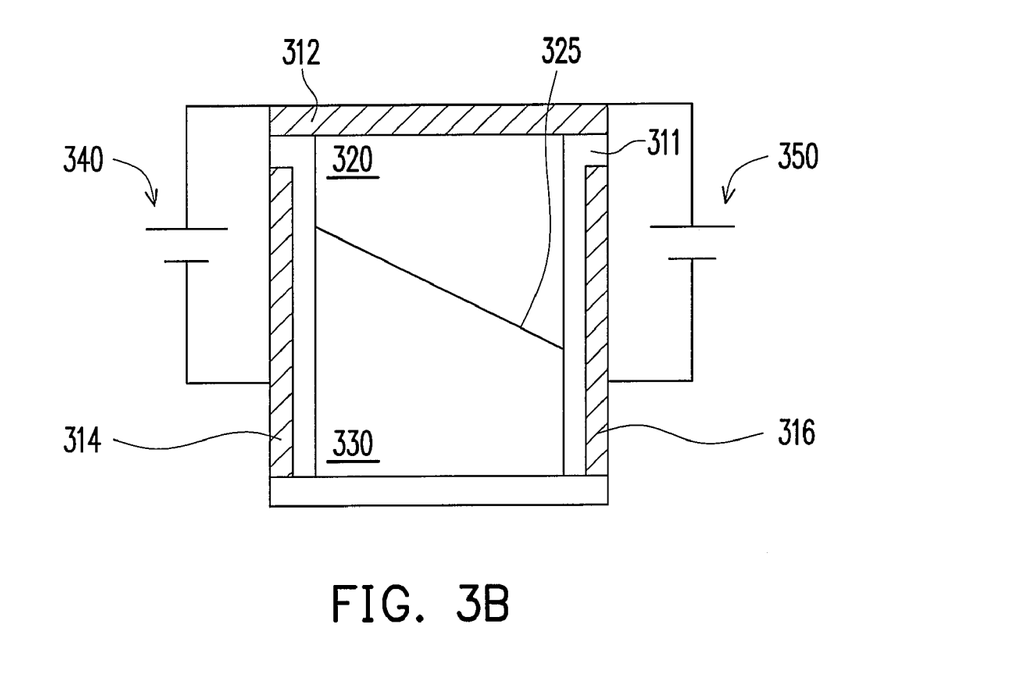
Figure 3C:
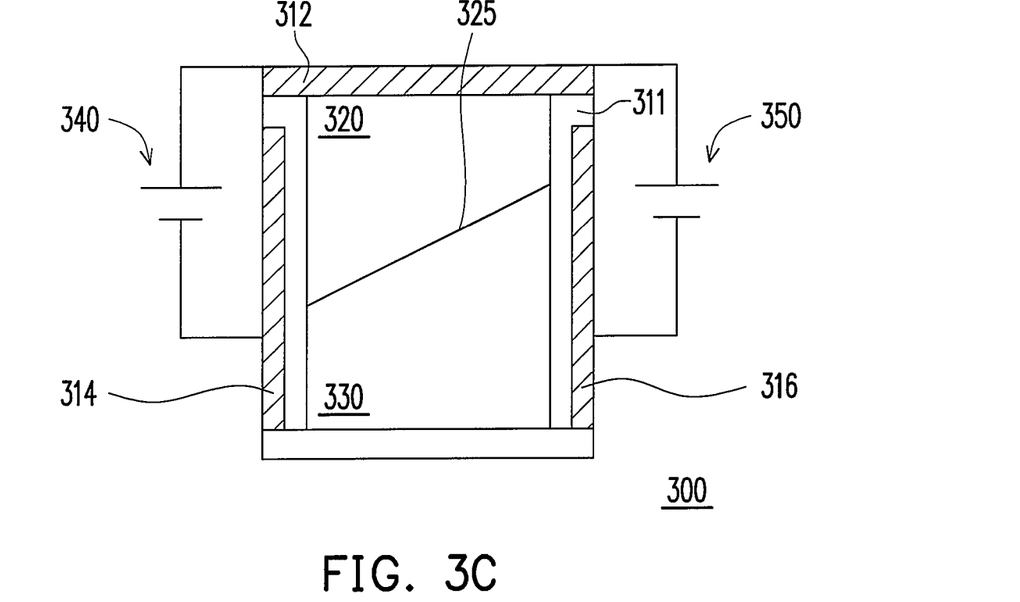

FIGS. 3A through 3C are schematic cross-sectional views of a liquid-control optical element according to a preferred embodiment of the present invention. The liquid-control optical element 300 in the preferred embodiment of the present invention includes a top electrode 312 located on a liquid carrier including an insulating layer 311 and two electrodes 314 and 316 on each side of the insulating layer 311. The top electrode 312 is a transparent electrode layer. The bottom of the insulating layer 311 has a transparent substrate 313. The material forming the insulating layer 311 includes a non-conductive photoresist or Teflon, for example. Two liquids with different phases are injected into the optical element 300, for example, one of which is an insulating liquid while the other is a conducting liquid and they are immiscible with each other. In the present embodiment, the conducting liquid can be a water-phase liquid 330 and the insulating liquid can be an oil-phase liquid 320. Obviously, in another embodiment, the location of the oil-phase liquid 320 and the water-phase liquid 330 can be reversed. The material forming the transparent substrate 313 includes quartz or glass, for example. The material forming the top electrode 312, that is, the transparent electrode layer, includes a transparent conductive material layer such as indium tin oxide (ITO) layer or an indium zinc oxide (IZO) layer. The material forming the two electrodes 314 and 316 on each side of the insulating layer 311 includes the indium tin oxide (ITO) layer, the indium zinc oxide (IZO) layer, or metal.

Through the establishment of different voltages between the top electrode 312 and the two electrodes 314 and 316, different electric field effects are produced so that the slope of the contact interface between the two liquids 320 and 330 is changed. The tilted contact interface 325 can provide an incident light beam traveling from top to bottom (or from bottom to top) with a penetrating path or a total internal reflection path. Thus, the liquid-control optical element 300 really serves as a liquid shutter device capable of controlling the entrance of a light beam. As shown in FIG. 3B, a voltage source 340 is provided between the top electrode 312 and the electrode 314 and a voltage source 350 is provided between the top electrode 312 and the electrode 316. When the voltage values of the voltage sources 340 and 350 are adjusted, the contact interface 325 between the two liquids 320 and 330 can be higher close to the electrode 314 and lower close to the electrode. 316. As shown in FIG. 3C, when the voltages of the voltage sources 340 and 350 are readjusted, the contact interface 325 between the two liquids 320 and 330 can be lower close to the electrode 314 and higher close to the electrode 316.

Figure 3D:
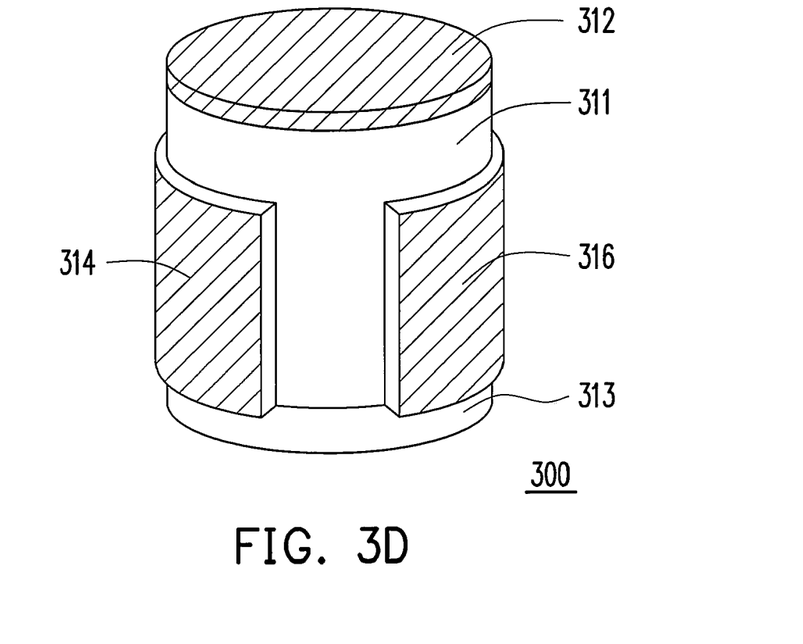
FIG. 3D is a side view of a liquid-control optical element according to an embodiment of the present invention.
Figure 3E:
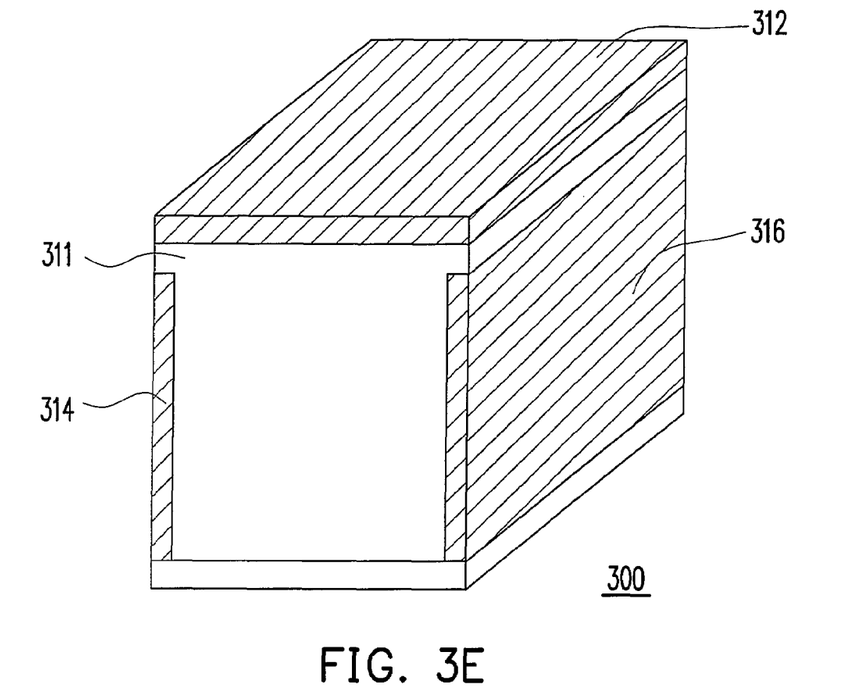
FIG. 3E is a side view of a liquid-control optical element according to another embodiment of the present invention.

The liquid-control optical element 300 in the present invention can have a structure as shown in FIG. 3D. The optical element 300 has a circular pillar structure with a top electrode 312 above the insulating layer 311 and another two electrodes 314 and 316 on each side of the insulating layer 311. In addition, the liquid-control optical element 300 in the present invention can have another structure as shown in FIG. 3E. The optical element 300 has a rectangular structure. In other words, the liquid-control optical element 300 in the present embodiment can have a triangular pillar body, a rectangular pillar body, a pentagonal pillar body, a polygonal pillar body or a circular pillar body, with the actual shape depending on the requirements in the design.

Figure 3F:
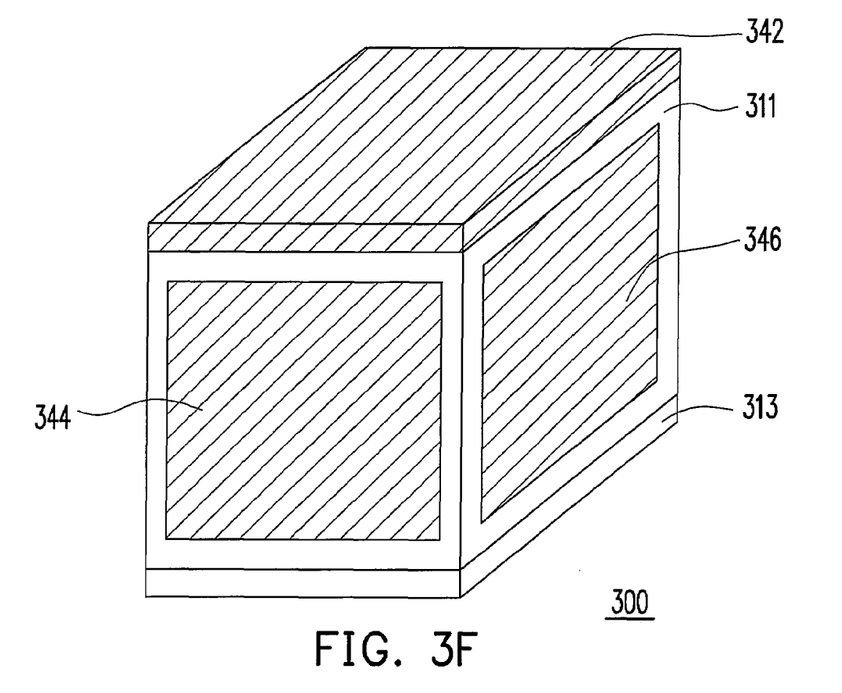
FIG. 3F is a side view of a liquid-control optical element according to yet another embodiment of the present invention.

As mentioned before, the liquid-control optical element of the present invention may be expanded to a four-electrode or a six-electrode element following the same operating principles in other embodiments and applied to different areas. For example, as shown in FIG. 3F, the liquid-control optical element 300 has a rectangular structure with a top electrode 342 located above the insulating layer 311 and four electrodes disposed on four side surfaces of the insulating layer 311. Thus, the liquid-control optical element can be applied to scan a two-dimensional plane.

Figure 4A:
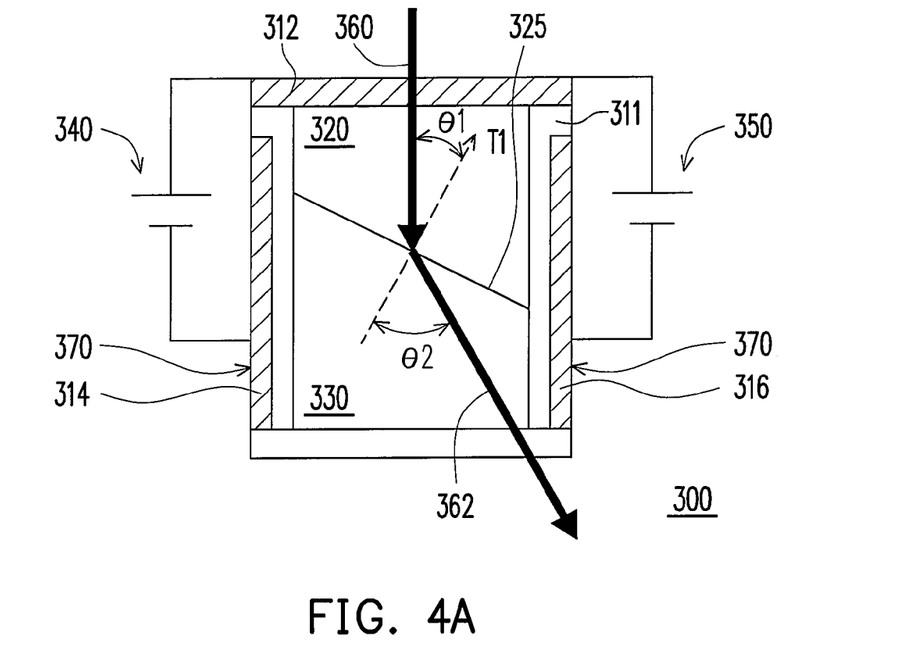
FIGS. 4A and 4B are schematic cross-sectional views showing the liquid-control optical element of the present invention operating according to the law of refraction.
Figure 4B:
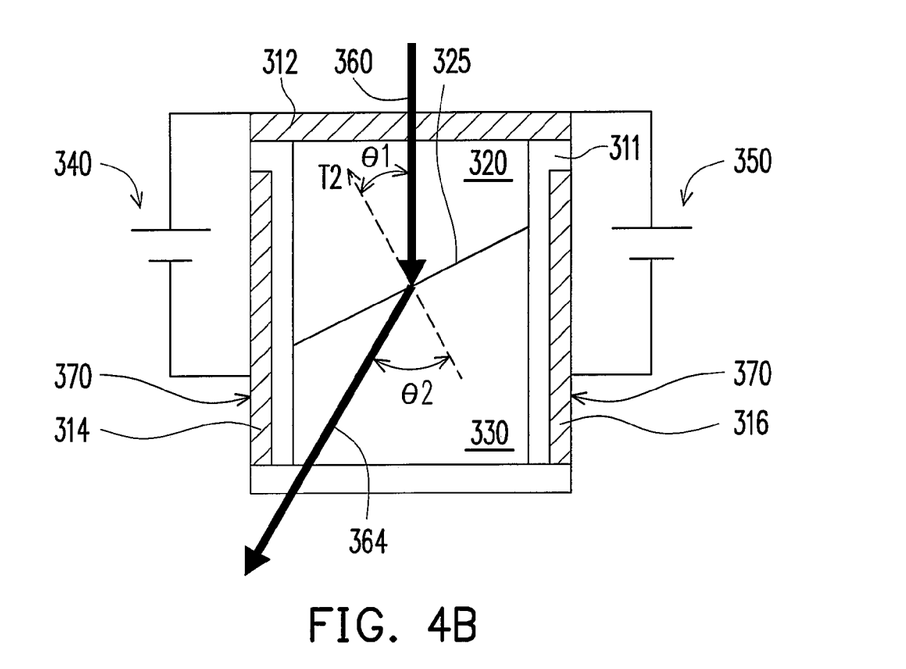

The changing of the slope of the liquid interface and the actual operation according to the law of refraction is depicted in FIGS. 4A and 4B. In the present embodiment, the liquid-control optical element 300 includes a top electrode 312. An inner layer of the two sidewalls 370 of a liquid carrier have an electrode 314 and an insulating layer 311 and another electrode 316 and the insulating layer 311. The foregoing conductive bodies are disposed between the sidewalls and the insulating layer. As shown in FIG. 4A, when an incident light beam 360 penetrates the top electrode 312 into the optical element 300, the light beam 360 passes through the oil-phase liquid 320 to reach the contact interface 325 between the two liquids 320 and 330. The angle of incident of the light beam 360 (that is, the included angle with a normal T1 to the contact interface 325) is $\Theta_1$. Because the voltage values of the voltage sources 340 and 350 are adjusted so that the contact interface 325 is higher on that side close to the electrode 314 than the other side close to the electrode 316, the incident light beam 360 is refracted to produce a refracted light beam 362 after refraction. The refracted light beam 362 proceeds in a direction forming an included angle $\Theta_2$ with a normal to the contact interface 325 (opposite direction to T1).

As shown in FIG. 4B, when the voltage values of the voltage sources 340 and 35.0 are adjusted so that the contact interface 325 is lower on that side close to the electrode 314 than the other side close to the electrode 316, the angle of incident of the incident light beam 360 forms an angle $\Theta_1$ with a normal T2 to the contact interface 325. The incident light beam 360 is refracted to produce a refracted light beam 364 after refraction. The refracted light beam 364 proceeds in a direction forming an included angle $\Theta_2$ with a normal to the contact interface 325 (opposite direction to T2).

Figure 5A:
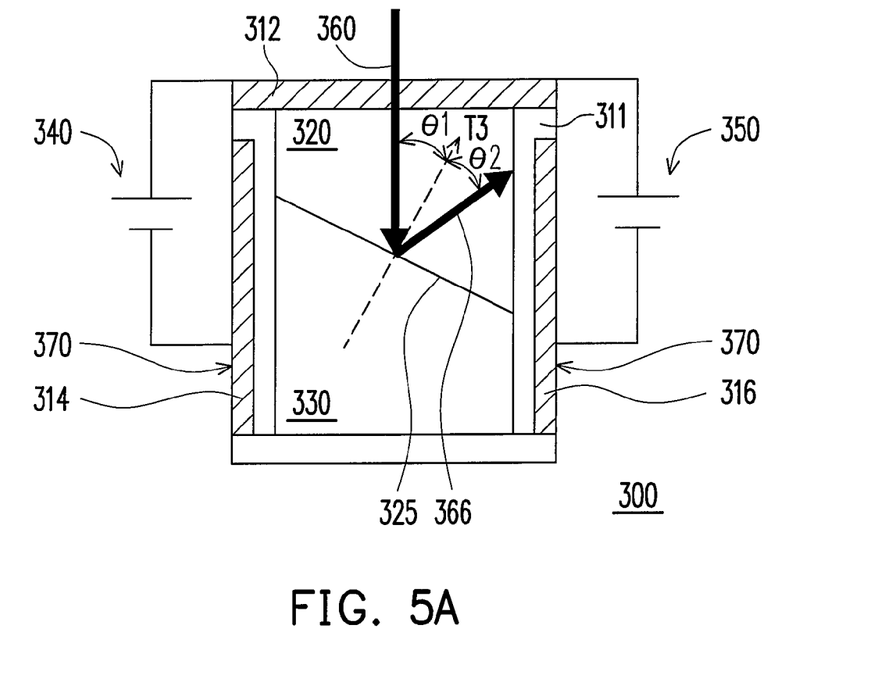
FIGS. 5A and 5B are schematic cross-sectional views showing the liquid-control optical element of the present invention operating according to the law of total internal reflection.
Figure 5B:
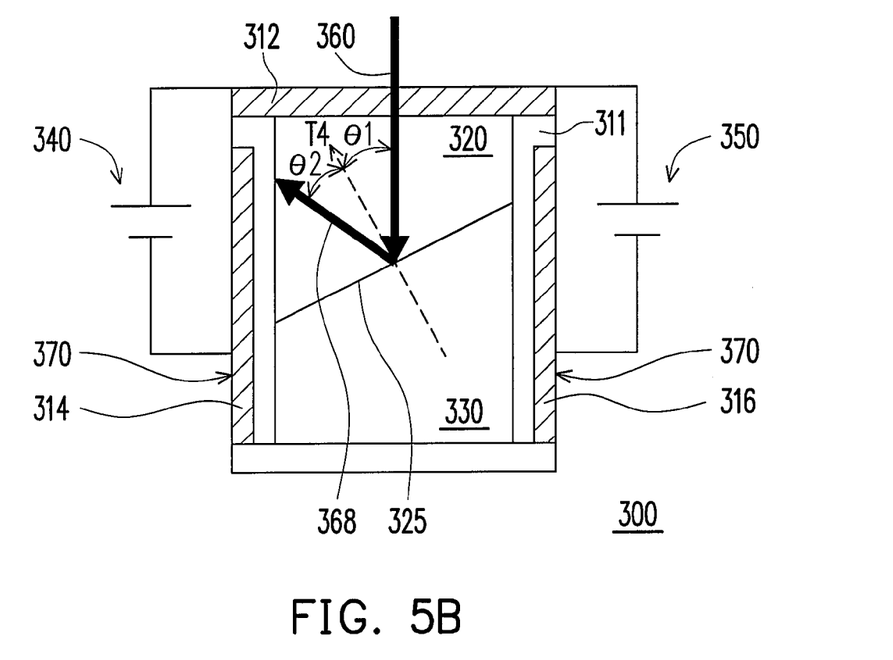

Changing the slope of the liquid interface and actual operation according to the law of total internal reflection is depicted in FIGS. 5A and 5B. As shown in FIG. 5A, when an incident light beam 360 penetrates the top electrode 312 into the optical element 300, the light beam 360 passes through the oil-phase liquid 320 to reach the contact interface 325 between the two liquids 320 and 330. The angle of incident of the light beam 360 (that is, the included angle with a normal T3 to the contact interface 325) is $\Theta_1$. Because the voltage levels of the voltage sources 340 and 350 are adjusted so that the contact interface 325 is higher on that side close to the electrode 314 than the other side close to the electrode 316, the incident light beam 360 is reflected to produce a reflected light beam 366 after total internal reflection. The reflected light beam 366 proceeds in a direction forming an included angle $\Theta_2$ with the normal T3 to the contact interface 325.

As shown in FIG. 5B, when the voltage levels of the voltage sources 340 and 350 are adjusted so that the contact interface 325 is lower on that side close to the electrode 314 than the other side close to the electrode 316, the angle of incident of the incident light beam 360 forms an angle $\Theta_1$ with a normal T4 to the contact interface 325. The incident light beam 360 is reflected to produce a reflected light beam 368 after total internal reflection. The reflected light beam 368 proceeds in a direction forming an included angle $\Theta_2$ with the normal T4 to the contact interface 325.

Figure 6:
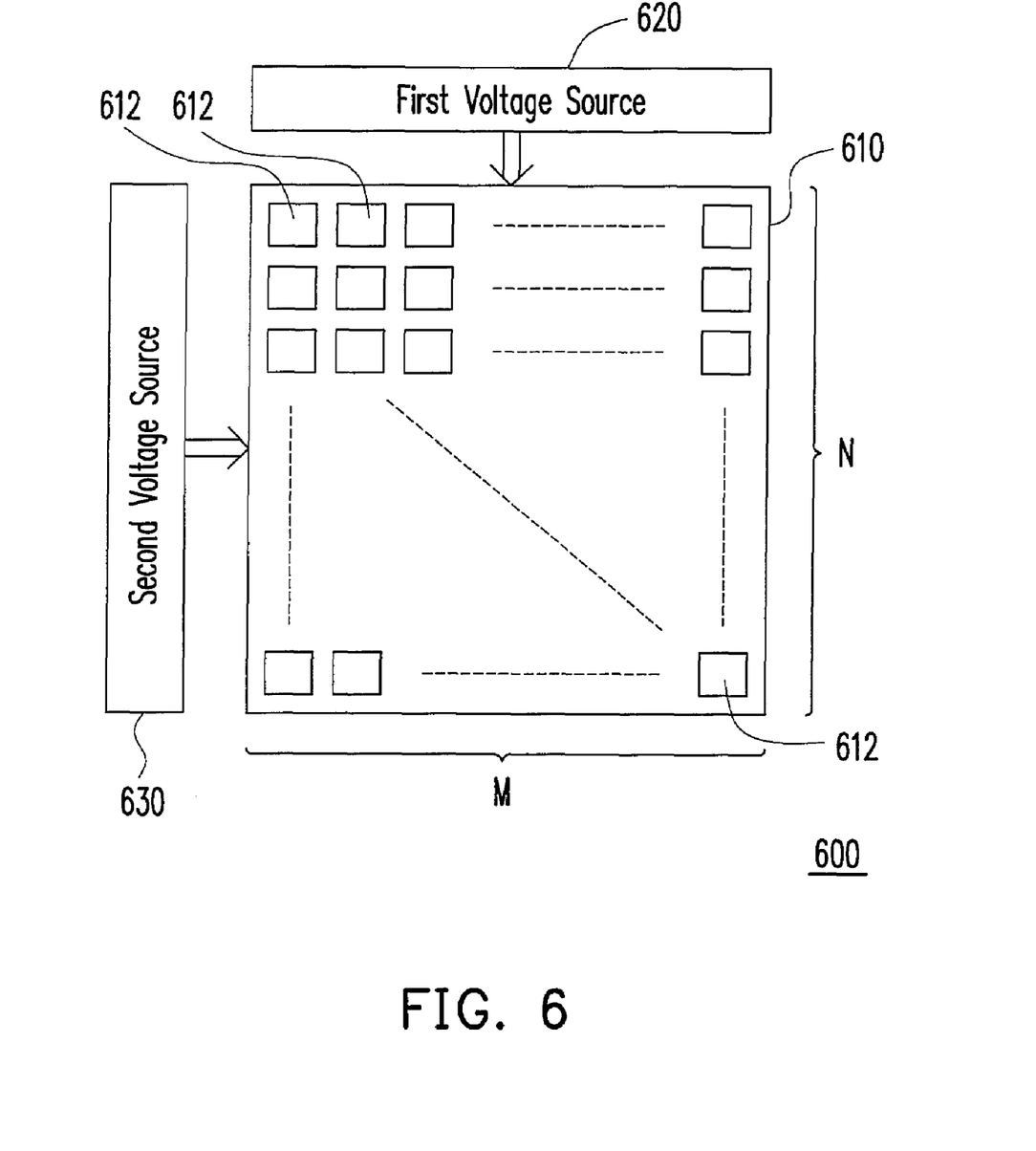
FIG. 6 is a diagram showing the liquid-control optical element of the present invention applied to a display device.

As shown in FIG. 6, the liquid-control optical element of the present invention can be applied to the panel 610 of a display device 600. A plurality of liquid-control optical elements is arranged to form an M×N array of liquid-control optical elements 612. Each liquid-control optical element 612 is connected to a first voltage source 620 and a second voltage source 630 through an internal wiring circuit layout. By providing a different voltage through the first voltage source 620 and the second voltage source 630, different refraction or total internal reflection of an incident light beam can be obtained. Furthermore, with the disposition of a back light source to provide light and associated filtering lenses and polarizing plates, the display device 600 is fully operational. Because the liquid-control optical element of the present invention utilizes an applied voltage to produce different optical refraction or total internal reflection, the display device 600 has a higher efficiency and transmittance than the conventional liquid crystal display (the transmittance of the conventional liquid crystal display is 4%~6%). Furthermore, together with a timing back light module, a display capable of producing more colors is produced.

Figure 7:
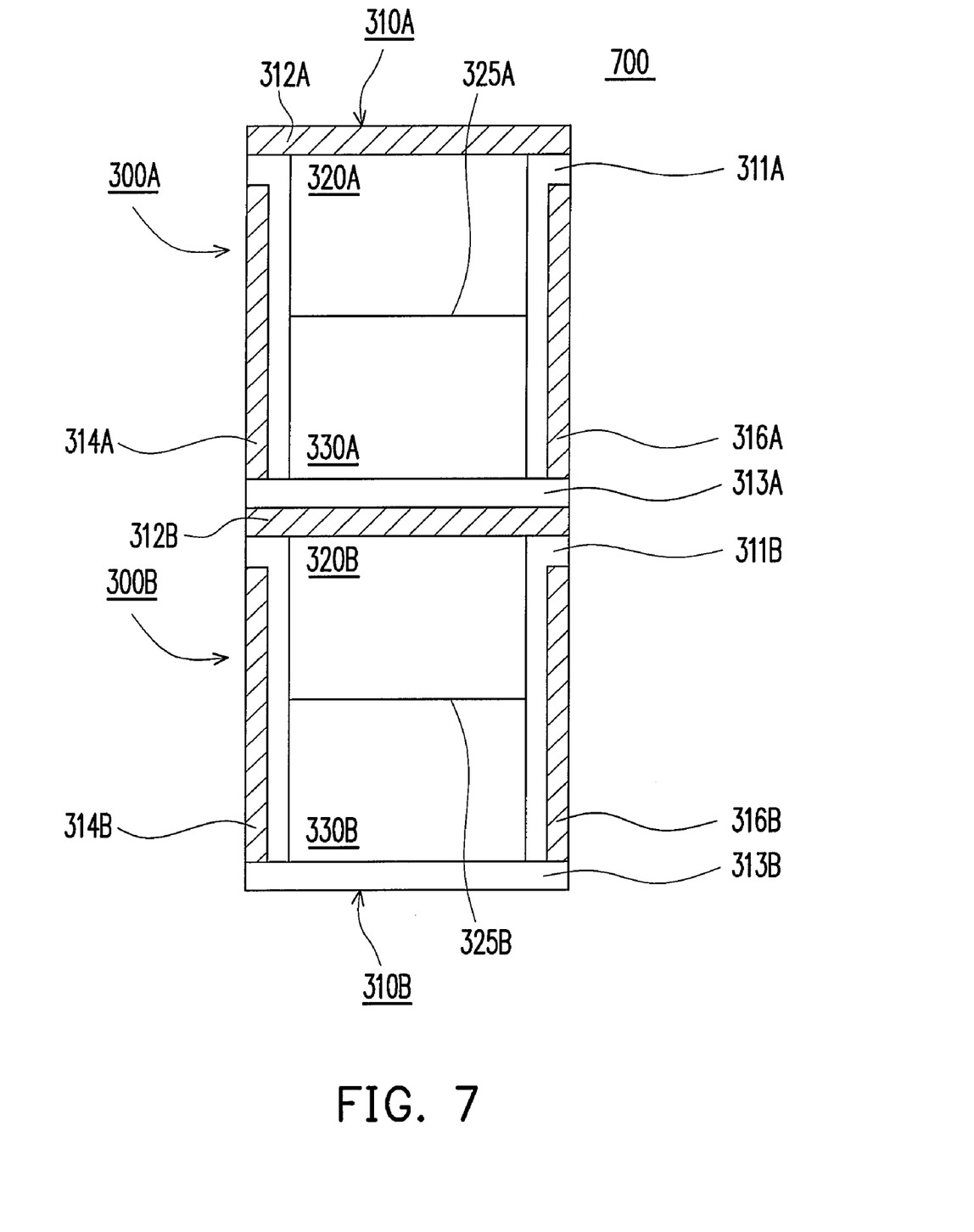
FIG. 7 is a schematic cross-sectional view of a liquid-control optical element according to another embodiment of the present invention.

FIG. 7 is a schematic cross-sectional view of a liquid-control optical element according to another embodiment of the present invention. The optical element 700 in the present embodiment includes two serially stacked liquid-control optical elements 300A and 300B. The liquid-control optical element 300A includes a top electrode 312A disposed on an insulating layer 311A and two electrodes 314A and 316A disposed on two sides of the insulating layer 311A. The top electrode 312A is a transparent electrode layer. The bottom of the optical element 300A has a transparent substrate 313A. Two liquids with different phases are injected into the optical element 300A, for example, one of which is an insulating liquid while the other is a conducting liquid and they are immiscible with each other. In the present embodiment, the conducting liquid can be a water-phase liquid 330A and the insulating liquid can be an oil-phase liquid 320A.

The liquid-control optical element 300B includes a top electrode 312B disposed on an insulating layer 311B and two electrodes 314B and 316B disposed on two sides of the insulating layer 311B. The top electrode 312B is a transparent electrode layer. The bottom of the optical element 300B has a transparent substrate 313B. Two liquids with different phases are injected into the optical element 300B, for example, one of which is an insulating liquid while the other is a conducting liquid and they are immiscible with each other. In the present embodiment, the conducting liquid can be a water-phase liquid 330B and the insulating liquid can be an oil-phase liquid 320B.

By establishing different voltage values between the top electrodes 312A and 312B, and the two electrodes 314A and 314B and the two electrodes 316A and 316B, different electric field effects are produced. Hence, the slopes of the contact interfaces 325A and 325B between the oil-phase liquids 320A and 320B and the water-phase liquids 330A and 330B are changed. The tilted contact interfaces can provide an incident light beam traveling from top to bottom with a penetrating path or a total internal reflection path. Thus, the liquid-control optical element 700 really serves as a liquid shutter device capable of controlling the entrance of a light beam, or a liquid scanner device if a scanning is performed after penetrating the element.

In another selective embodiments, the optical element of the present invention can include three or more than three serially stacked liquid-control optical elements.

Figure 8A:
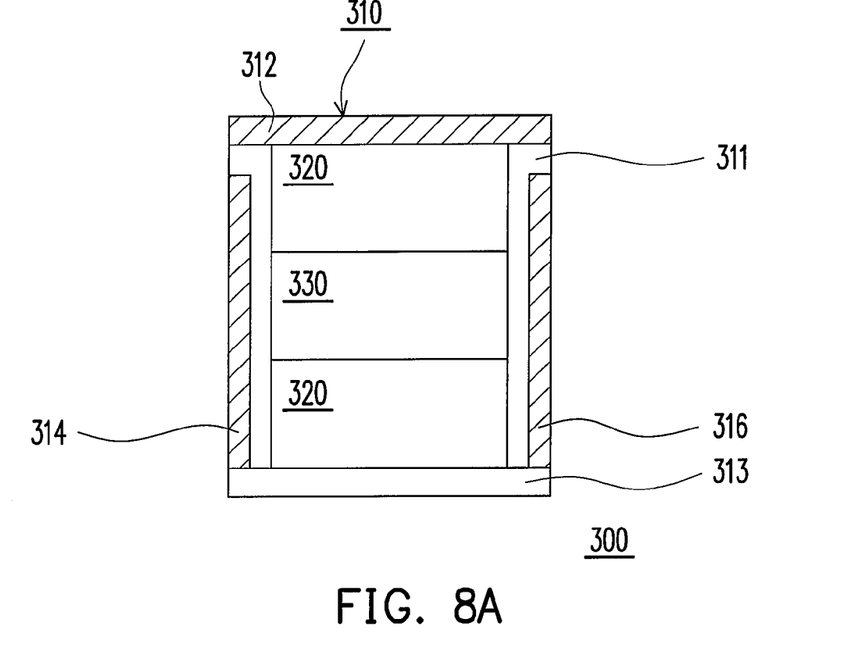
FIG. 8A is a schematic cross-sectional view of a liquid-control optical element according to yet another embodiment of the present invention.
Figure 8B:
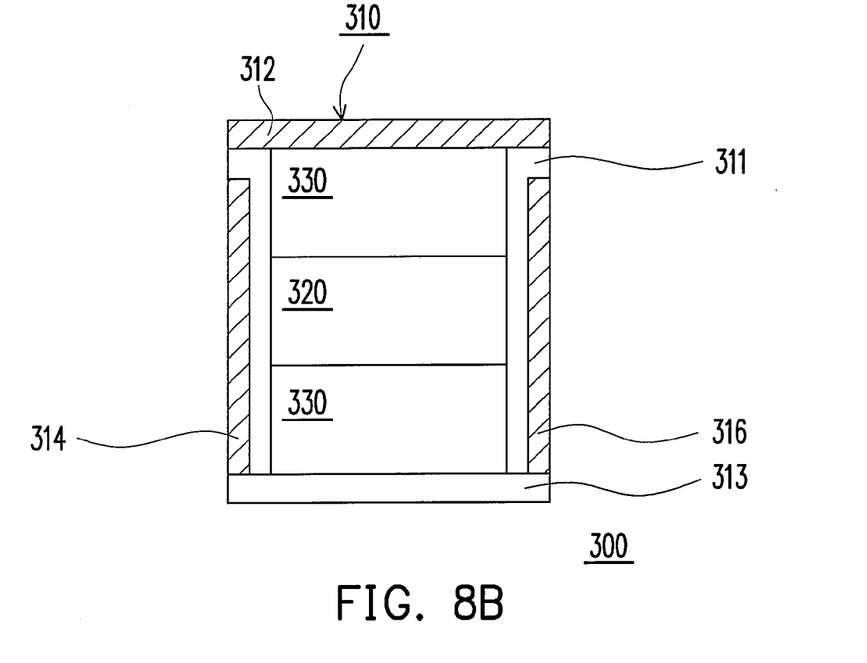
FIG. 8B is a schematic cross-sectional view of a liquid-control optical element according to yet another embodiment of the present invention.

In another embodiment of the present invention, the number of liquids inside a liquid-control optical element is not limited to two, a water-phase liquid and an oil-phase liquid as shown in FIG. 3A, for example. The optical element can have three or more alternately disposed water-phase and oil phase liquid layers. This type of optical element having a multi-layer structure is shown in FIGS. 8A and 8B. Because the structure of the liquid-control optical element is identical to the one in FIG. 3A, the embodiment is described with identical labels. In the liquid-control optical element in FIG. 8A, a water-phase liquid layer 330 is disposed between two oil-phase liquid layer 320. In the liquid-control optical element in FIG. 8B, an oil-phase liquid layer 320 is disposed between two water-phase liquid layer 330.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid-control optical element, comprising:
a first liquid and a second liquid, wherein the first liquid and the second liquid are immiscible and form a liquid contact interface within the optical element; and
a liquid carrier for controlling the first liquid and the second liquid inside the optical element, the liquid carrier comprising:
an insulating layer serving as an inner sidewall layer of the liquid carrier, wherein an interior of the insulating layer carries the first liquid and the second liquid, and an exterior of the insulation layer is provided with at least a first side electrode layer and a second side electrode layer; and
a top surface layer; and a bottom surface layer, which are a transparent electrode layer and a transparent layer respectively,
wherein a first voltage is applied between the first side electrode layer and the transparent electrode layer, and a second voltage is applied between the second electrode layer and the transparent electrode layer.

2. The liquid-control optical element of claim 1, wherein the first liquid and the second liquid are a conducting liquid and a non-conducting liquid respectively.

3. The liquid-control optical element of claim 2, wherein the first liquid and the second liquid are immiscible each other.

4. The liquid-control optical element of claim 3, wherein the first and second liquids as a top and bottom stack layer completely fill up an inner space of the liquid carrier of the liquid-control optical element.

5. The liquid-control optical element of claim 4, wherein the liquid carrier of the liquid-control optical element has a triangular pillar body, a rectangular pillar body, a pentagonal pillar body, a polygonal pillar body or a circular pillar body.

6. The liquid-control optical element of claim 3, wherein the first liquid and the second liquid are alternately disposed such that a three-layer stack layer comprising the first, second and first liquid layers completely fills up the inner space of the liquid carrier of the liquid-control optical element.

7. The liquid-control optical element of claim 1, wherein a material constituting the insulating layer comprises a non-conductive photoresist or Teflon.

8. The liquid-control optical element of claim 1, wherein a material constituting the side electrode layers comprises indium tin oxide, indium zinc oxide or a metal.

9. The liquid-control optical element of claim 1, wherein a material constituting the transparent electrode layer comprises indium tin oxide or indium zinc oxide, and a material constituting the transparent layer comprises quartz or glass.

10. The liquid-control optical element of claim 1, wherein the first voltage and the second voltage produce an electric field inside the liquid carrier of the liquid-control optical element, and a slope of the contact interface of the two immiscible liquids is adjustable by adjusting the first voltage and the second voltage.

11. The liquid-control optical element of claim 10, wherein any variation of the slope of the liquid contact interface changes a light path of an incident light beam inside the liquid-control optical element.

12. The liquid-control optical element of claim 11, wherein the variation of the light path inside the liquid-control optical element comprises a total internal reflection path and refraction paths at different angles.

13. The liquid-control optical element of claim 12, wherein a light beam passing through the liquid-control optical element follows the variation of the slope of the liquid contact interface due to the application of a sequentially varied voltage to produce a scanning effect of a refracted light beam or serve as an optical shutter when the light is totally reflected.

14. A method of manufacturing a liquid-control optical element, comprising:
providing a liquid carrier;
forming an insulating layer on an inner sidewall of the liquid carrier, and forming an electrode layer on the insulating layer, wherein the electrode layer comprises a first side electrode layer and a second electrode layer;
providing a transparent electrode layer and a transparent layer on a top and bottom surface of the liquid carrier respectively, and connecting the first side electrode layer, the second side electrode layer, and the transparent electrode layer to different voltage sources;
sequentially loading a first liquid and a second liquid into the liquid carrier such that the first liquid is stacked over the second liquid, wherein the contact interface between the first liquid and the second liquid is an immiscible liquid interface; and
applying a first voltage between the first electrode layer and the transparent electrode layer and applying a second voltage between the second electrode layer and the transparent electrode layer to produce a controlling electric field inside the liquid carrier of the liquid-control optical element, and using the controlling electric field to change the slope of the liquid contact interface and produce a liquid-control optical element for controlling a light path.

15. The method of manufacturing the liquid-control optical element of claim 14, wherein the first liquid and the second liquid are a conducting liquid and a non-conducting liquid respectively.

16. The method of manufacturing the liquid-control optical element of claim 15, wherein the first liquid and the second liquid are immiscible each other.

17. The method of manufacturing the liquid-control optical element of claim 16, wherein the first and second liquids as a top and bottom stack layer completely fill up an inner space of the liquid carrier of the liquid-control optical element.

18. The method of manufacturing the liquid-control optical element of claim 17, wherein the liquid carrier of the liquid-control optical element has a triangular pillar body, a rectangular pillar body, a pentagonal pillar body, a polygonal pillar body or a circular pillar body.

19. The method of manufacturing the liquid-control optical element of claim 16, wherein the first liquid and the second liquid are alternately disposed such that a three-layer stack layer comprising the first, second and first liquid layers completely fills up the inner space of the liquid carrier of the liquid-control optical element.

20. The method of manufacturing the liquid-control optical element of claim 14, wherein a material constituting the insulating layer comprises a non-conductive photoresist or Teflon.

21. The method of manufacturing the liquid-control optical element of claim 14, wherein a material constituting the side electrode layers comprises indium tin oxide, indium zinc oxide or a metal.

22. The method of manufacturing the liquid-control optical element of claim 14, wherein a material constituting the transparent electrode layer comprises indium tin oxide or indium zinc oxide, and a material constituting the transparent layer comprises quartz or glass.

23. The method of manufacturing the liquid-control optical element of claim 14, wherein the controlling electric field produced by the application of different voltages has the capability of changing the slope of the plane of the liquid interface between the two immiscible liquids.

24. The method of manufacturing the liquid-control optical element of claim 23, wherein a variation of the slope of the liquid contact interface has the capability of changing a light path inside the liquid-control optical element.

25. The method of manufacturing the liquid-control optical element of claim 24, wherein the variation of the light path inside the liquid-control optical element comprises a total internal reflection path and refraction paths at different angles.

26. The method of manufacturing the liquid-control optical element of claim 25, wherein a light beam passing through the liquid-control optical element follows the variation of the slope of the liquid contact interface due to the application of a sequential variation of voltage to produce a scanning effect of a refracted light beam or an optical shuttering effect when the light is totally reflected.

27. An optical element device for controlling a liquid interface formed between a first liquid and a second liquid which are immiscible each other, the first liquid being stacked on the second liquid, the optical element device comprising:
a liquid carrier comprising:
an inner sidewall layer coated with an insulating material layer, and
a side electrode layer provided outside the inner sidewall layer, wherein the insulating material layer contacts with the first liquid and the second liquid, and the side electrode layer comprises a first side electrode and a second side electrode;
a transparent electrode layer, formed on a surface of the liquid carrier substantially normal to the side electrode layer, and separated from the side electrode layer through the insulating material layer;
a transparent layer, formed on another surface of the liquid carrier substantially normal to the first side electrode and the second electrode; and
at least a first voltage source and a second voltage source, wherein the first voltage source is provided between the first side electrode and the transparent electrode layer, and the second voltage source is provided between the second electrode and the transparent electrode layer.

28. The optical element device of claim 27, wherein the first liquid and the second liquid are immiscible each other.

29. The optical element device of claim 28, wherein the first and second liquids as a top and bottom stack layer completely fill up an inner space of the liquid carrier of the liquid-control optical element.

30. The optical element device of claim 29, wherein the liquid carrier has a triangular pillar body, a rectangular pillar body, a pentagonal pillar body, a polygonal pillar body or a circular pillar body.

31. The optical element device of claim 27, wherein the first liquid and the second liquid are alternately disposed such that a three-layer stack layer comprising the first, second and first liquid layers completely fills the interior of the liquid carrier.

32. A device having a plurality of liquid-control optical elements, each liquid-control optical element comprising a controlling electric field controlled contact interface formed by two immiscible liquids, wherein the liquid-control optical elements are arranged to form an array, each liquid-control optical element is controlled by at least a first voltage source and a second voltage source, the controlling electric field is varied by controlling the first voltage and the second voltage so as to adjust a slope of the contact interface of the two immiscible liquids, and hence to control the refraction or reflection angle of an incident light beam passing through the liquid-control optical element, wherein each liquid-control optical element is provided with a top electrode at a top side of the liquid-control optical element, and a first side electrode and a second side electrode at two opposite sides of the liquid-control optical element, and the first voltage source is connected between the top electrode and the first electrode, and the second voltage source is connected between the top electrode and the second electrode, wherein the first side electrode and the second electrode are configured on an outside wall of the liquid-control optical element.

33. A device having a plurality of liquid-control optical elements, each liquid-control optical element comprising a controlling electric field controlled contact interface formed by two immiscible liquids, wherein the liquid-control optical elements are arranged to stack one upon another, each liquid-control optical element is controlled by at least a first voltage source and a second voltage source, the controlling electric field is varied by controlling the first voltage and the second voltage so as to adjust a slope of the contact interface of the two immiscible liquids, and hence to control the refraction or reflection angle of an incident light beam passing through the liquid-control optical element, wherein each liquid-control optical element is provided with a top electrode at a top side of the liquid-control optical element, and a first side electrode and a second side electrode at two opposite sides of the liquid-control optical element, and the first voltage source is connected between the top electrode and the first electrode, and the second voltage source is connected between the top electrode and the second electrode, wherein the first side electrode and the second electrode are configured on an outside wall of the liquid-control optical element, and wherein each liquid-control optical element is hollow pillar shaped which defines an inner space, and the inner space is substantially completely filled with the first liquid and the second liquid.

34. The device of claim 33, wherein when the controlling electric field is not applied, the contact interface of the two immiscible liquids is substantially perpendicular to the first side electrode and the second side electrode.

* * * * *